Jan. 16, 1945.  A. M. ARNEY  2,367,555
MECHANISM TO OBTAIN AND CONTROL MOTION TRANSVERSE TO AXIS OF ROTATION
Filed Oct. 26, 1943  2 Sheets-Sheet 1
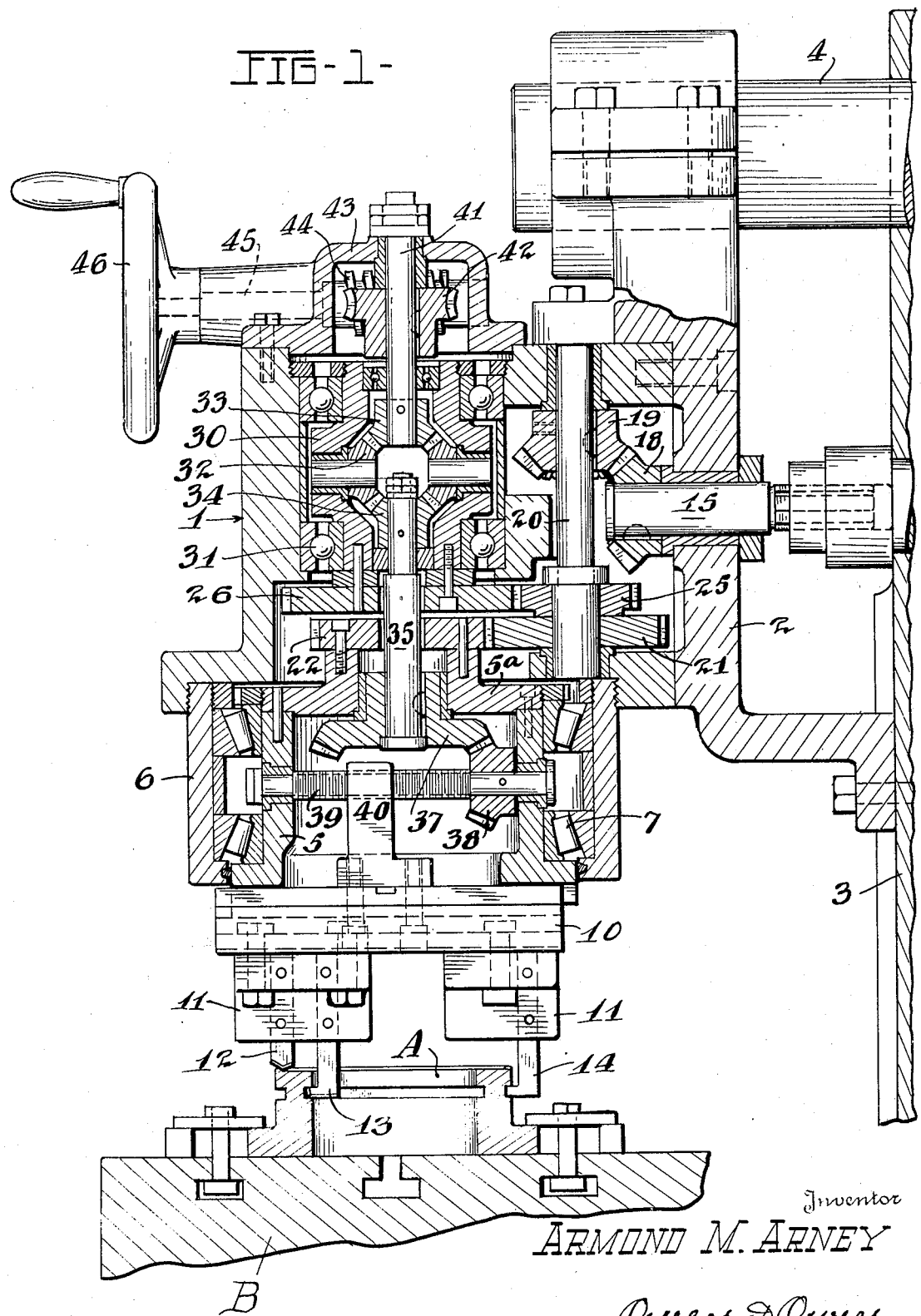
FIG-1-
Inventor
ARMOND M. ARNEY
By Owen & Owen
Attorneys

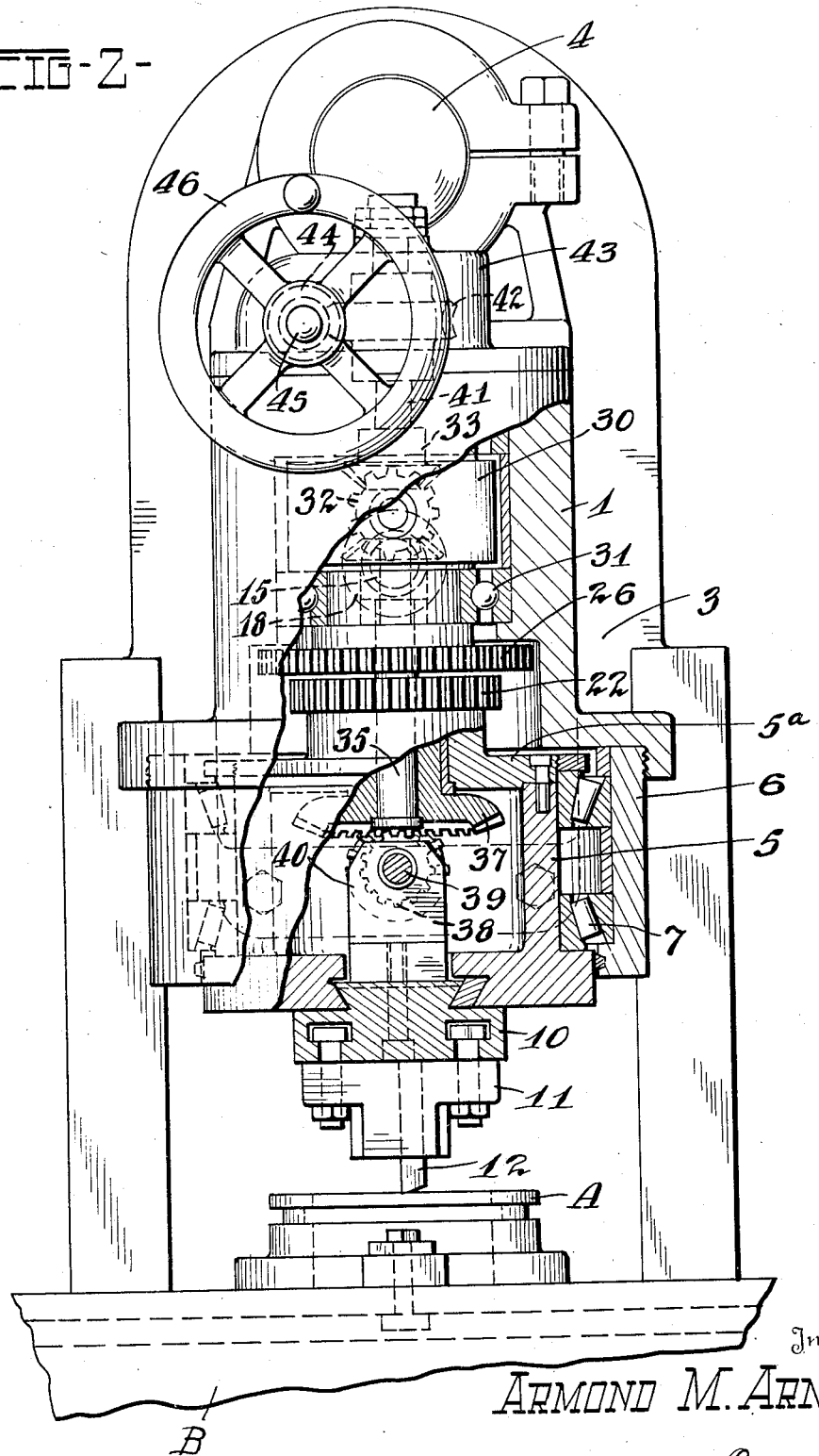

Patented Jan. 16, 1945

2,367,555

UNITED STATES PATENT OFFICE 2,367,555

MECHANISM TO OBTAIN AND CONTROL MOTION TRANSVERSE TO AXIS OF ROTATION

Armond M. Arney, Toledo, Ohio

Application October 26, 1943, Serial No. 507,716

5 Claims. (Cl. 74—600)

This invention relates to mechanical movements, and primarily to means for obtaining and controlling motion traverse to an axis of rotation and without interrupting or varying the speed of rotation about such axis.

The invention is particularly adaptable for use in connection with a rotary tool carrying head to effect and control movements of a tool transverse to the axis of rotation of the head and during rotation thereof, and its primary object is to provide a simple, efficient and positively acting mechanism for the purpose.

A further object of the invention is the provision of a control of the character described, which is under the complete control of the operator, is absolute over a predetermined range of adjustment and is independent of the head drive to enable the operator to start and stop the tool adjusting movement at will and while the head drive remains constant.

Further objects and advantages of the invention will be apparent from the following detailed description, and from the accompanying drawings, illustrating one embodiment thereof, and in which—

Fig. 1 is a central vertical section of an attachment embodying the invention, with parts in full and with the associated machine fragmentarily shown, and Fig. 2 is an elevation thereof looking toward the associated machine, with parts shown in vertical cross-section and parts broken away.

While the invention is capable of use in connection with any machine or mechanism, wherein it is desirable to obtain and control movements of a rotatably driven tool or part in a plane transverse to the axis of rotation, it is, for the purpose of illustration, shown herein as incorporated in a boring and facing head used as a milling machine attachment.

Referring to the drawings, the attachment housing is designated 1 and is fixedly carried by a back-plate 2 which, in the present instance, is bolted or otherwise fixedly secured to the side frame 3 of a milling machine and clamped at its top around the over-arm 4 of the machine.

The rotary head 5 of the attachment is of cylindrical or hollow form and is suitably journaled for rotary movements in an extension 6 of the body housing 1 with its lower or outer end exposed. In the present instance the head has a roller bearing mount 7 in the extension. A slide block 10 has dovetail sliding connection with the outer side of the head for turning movements therewith and for adjustment relative thereto in a plane transverse to its axis of rotation. One or more tool blocks 11 may be carried by the slide 10 and adapted for the attaching of a suitable tool or tools thereto for acting on a work-piece A mounted on a bed B, as well understood in the art. In the present instance, the slide is shown as equipped with a facing tool 12, an inner recessing tool 13 and an outer grooving tool 14, and these may be used together or singly, as desired.

The rotary drive for the head 5 is from a shaft 15 journaled in the back-plate 2 with its axis of rotation at right angles to that of the head axis and adapted for connection to the adjacent end of the horizontal spindle or other suitable drive part (not shown) of the associated machine. A bevel gear 18 is mounted on the shaft 15 within the housing 1 and drives a companion bevel gear 19 on a countershaft 20 that is journaled in the housing with its axis parallel to the axis of rotation of the rotary head 5. The shaft 20, at the end thereof adjacent to the head, fixedly carries a spur gear 21 in mesh with a like-sized spur gear 22 concentric to the axis of rotation of the head 5 and fixed to its inner end plate 5ª for rotation therewith. The drive of the head 5 from the shaft 15 is at a ratio of one to one.

The countershaft 20 also carries and drives a spur gear 25, which is smaller than the gear 21, and drives a spur gear 26, of twice the number of teeth, that is concentric to the gear 22 but free therefrom, and disposed adjacent to a side thereof opposed to the head 5. The ratio of drive of the gear 26 from the shaft 15 is one-half to one. The gear 26 is fixed at the side thereof opposed to the gear 22 to a differential housing 30 that is mounted for rotation concentric to the axis of rotation of the head 5 within ball bearings 31 in the housing 1.

Two axially opposed bevel idler pinions 32 are mounted in the differential housing 30 with both in mesh at one side with a bevel control gear 33 and at the opposite side, which is adjacent to the gear 26, with a bevel drive gear 34 of the same number of teeth as the gear 33. The gear 34 is keyed to a shaft 35 that is coaxial with and extends freely through the gears 26 and 22 and head plate 5ª and fixedly carries a bevel gear 37 at its opposite end within the hollow of the head 5. The hub of this gear is journaled in the head plate 5ª to center the shaft and gear relative to the head. The gear 37 meshes with a smaller bevel gear 38 mounted on a diametrical cross-shaft 39 in the head 5. This shaft has threaded connection with a boss 40 projecting centrally from the adjacent side of the slide block 10 up into the head so that rotation of the screw shaft imparts shifting movements to the slide block.

The differential control gear 33 is fixed to the inner end of a shaft 41 which is journaled in the inner end of the housing 1, or the inner end thereof opposed to the position of the head 5, and carries a worm wheel 42 in the cap portion 43 of the housing in mesh with a worm 44 on a control shaft 45. This shaft is mounted in the part 43 at right angles to the shaft 41 and carries at its outer end a hand wheel 46 for the purpose, in the present instance, of manual control.

In the operation of the device, in its illustrated embodiment, it is apparent that the head 5 has rotation imparted thereto from the shaft 15 at a one to one ratio, and also that the differential housing 30 receives its rotation from the shaft 15 at a ratio of one-half to one. Considering the control gear 33 as stationary, which is the case except when a transverse adjustment of the slide block 10 is being effected, its meshing with the bevel gears 32, which are turning with the differential housing 30, will cause the bevel gear 34 and the shaft 35, to which it is fixed, to rotate about the rotary head axis at a speed twice as fast as that of the differential housing. Thus, since shaft 35 rotates at a speed twice that of the differential housing and the differential housing rotates at a speed half that of the shaft 15, the bevel gear 37 within the head 5 will rotate at the speed of the shaft 15 and consequently at the speed of the head 5. It is thus apparent that when the control gear 33 is stationary, as above described, and the head is being driven, there can be no relative movement between the two gears 37 and 38 in the head. This condition results in the cutting tool traveling in a circular path, and when the work is presented to the cutting tool by elevating the work carrying table of the machine, the tool will cut an annular ring, turn the periphery or bore internally as desired and as suitable to the type of tool used. To obtain transverse shifting movements of the tool block 10, the gear 33 in the differential train is turned so as to vary the speed of driving of gear 34, as is apparent, and this varies the speed of driving of the head gear 37 relative to that of the head. This action causes turning of the screw shaft 39 to shift the tool block and the direction of shifting is dependent on the direction of turning of the control gear 33, whereby the gear 37 is caused to rotate either faster or slower than the rotation of the head 5. It is apparent that the speed of transverse shifting movement of the tool block is dependent on the pitch of the thread on the screw shaft 39 and the speed of turning of the gear 33 and is controlled during rotation of the head 5 by the latter.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a mechanism wherein a member is carried by a rotatable head for shifting movements transverse to the axis of head rotation, a rotary drive element, a rotatable differential housing, connections from said element respectively to said head and differential housing to drive them at different predetermined speeds, means rotatable with the head and operable to impart shifting movements to the member relative to the head, and controlled means associated with said differential housing and operable during rotation of the housing to actuate said member shifting means to impart predetermined shifting movements to the member or to hold said shifting means against movement relative to the head.

2. In a mechanism wherein a member is carried by a rotatable head for shifting movements transverse to the axis of head rotation, a rotary drive element, a rotatable differential housing, connections from said element respectively to said head and housing to drive them at different predetermined speeds, means rotatable with the head and operable relative thereto to impart predetermined shifting movements to the member, a differential gearing in said housing having a controlled gear and a driven gear, a driving connection between said driven gear and said means, said differential gearing operating by rotation of said housing to actuate said means to shift the member when said controlled gear is rotated and to prevent member shifting movements of said means when said controlled gear is stationary.

3. In a mechanism wherein a member is carried by a rotatably mounted head for shifting movements transverse to the axis of head rotation, a rotary drive element, a differential housing mounted for rotation coaxial with that of said head, connections respectively between said element and said head and housing to drive them at different predetermined speeds, means rotatable with and independently of the head and operable when moved relative thereto to impart predetermined shifting movements to said member, and a controlled differential gearing associated with said housing and connected to said means, said gearing being operable during rotation of said housing to synchronize the rotation of said means with that of the head to prevent member shifting operation of the means and to actuate said means relative to the head to shift the member.

4. In a mechanism wherein a member is carried by a rotatable head for shifting movements transverse to its axis of rotation, a member shifting means carried by said head and including an element rotatable relative to and in coaxial relation to the head, means for driving said head at a constant speed, means including a differential housing and gearing for driving said element at the same speed as the head and controllable through said gearing to vary the speed of said gear relative to the head speed, said shifting means operating to shift said member when the gear speed is varied relative to the head speed.

5. In a mechanism wherein a member is carried by a rotatable head for shifting movements transverse to its axis of rotation, a member shifting means carried by the head and including an element coaxial with the axis of rotation of the head and capable of independent rotation, a differential housing rotatable coaxially with said head rotation, means operable to constantly drive said head and housing at different predetermined speeds, a differential gearing associated with said housing and including a controlled gear and having driving connection with said element, and means for turning said controlled gear or holding it stationary, said differential gearing operating to drive said element at uniform speed with the head to prevent operation of the shifting means when the controlled gear is stationary and to effect predetermined operation of said shifting means when the controlled gear is rotated.

ARMOND M. ARNEY.